UNITED STATES PATENT OFFICE.

CARL PLATOW, OF LEHE, GERMANY.

PROCESS OF MANUFACTURING FIREPROOF FLOORING.

SPECIFICATION forming part of Letters Patent No. 769,355, dated September 6, 1904.

Application filed September 8, 1903. Serial No. 172,248. (No specimens.)

*To all whom it may concern:*

Be it known that I, CARL PLATOW, a subject of the Emperor of Germany, residing at Lehe, Bremerhaven, Germany, have invented certain new and useful Improvements in Processes of Manufacturing Fireproof Flooring, of which the following is a specification.

My invention relates to improvements in processes of making self-hardening compositions, and particularly to those processes wherein cement is used as a basis, and has for its objects the production of a plastic compound of great facility of application and of highly-non-inflammable properties and capable of setting and becoming integral with the part to which it is applied.

According to my invention I employ an oxychlorid cement, a filling of finely-divided wood fiber, and a Portland cement.

In the carrying out of my process to one part of commercial magnesia by weight I add two parts of sawdust and add thereto a thirty-per-cent. solution of chlorid of magnesium and then add twenty-five per cent., by bulk, of Portland cement. The mass is then applied to the article to be coated in a pasty condition to a thickness of about one-third of an inch and moistened with a solution of chlorid of magnesium. It is then heated until the parts assimilate and allowed to remain to set for a period of twelve hours, after which a second coating of equal strength is applied. The surface thus formed is then kneaded and pressed and polished with pumice-stone and thick oil and when smooth may be oiled and waxed.

A flooring or wall protection made and applied according to the herein-described process can by applying suitable color and quality of the fiber be arranged to represent any wood or grain of wood, and the surface to which it is applied may be rough or smooth. It has particular advantage from the fact that it presents a fireproof covering without seams or joints.

It is obvious that various proportions or relationship of ingredients may be made and that the various steps of the process may be slightly changed without departing from the spirit and scope of my invention.

What I claim, and desire to secure by Letters Patent, is—

1. A process of manufacturing self-hardening compositions that consists in forming a paste from magnesia, a filling material, a solution of chlorid of magnesium and Portland cement, allowing the mass to dry, moistening with a solution of chlorid of magnesium and heating.

2. A process of manufacturing self-hardening coating compositions that consists in forming a paste from magnesia, a filling material, chlorid of magnesium and Portland cement, allowing the mass to dry, moistening with a solution of chlorid of magnesium, heating, applying a coat of the same composition to the hardened surface, then kneading and polishing.

3. A process of manufacturing self-hardening compositions that consists in forming a paste of magnesia and wood filler by the addition of chlorid of magnesium, adding to the mass Portland cement in suitable quantities, allowing the mass to dry, moistening the mass with a solution of chlorid of magnesium and heating.

CARL PLATOW.

Witnesses:
 JOH FEHT,
 CARL SCHILLER.